No. 827,497. PATENTED JULY 31, 1906.
O. BAYSDORFER.
STATIC ELECTRIC MACHINE.
APPLICATION FILED NOV. 9, 1905.
2 SHEETS—SHEET 2.
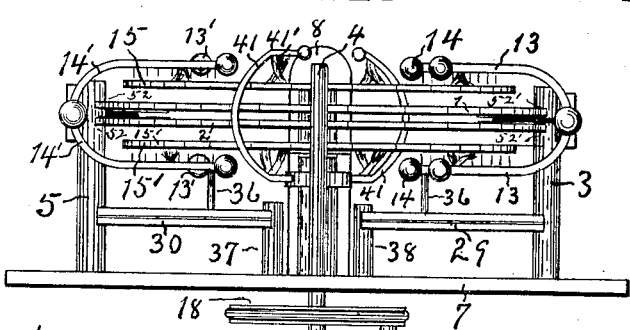
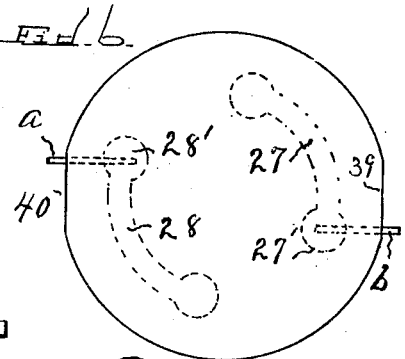
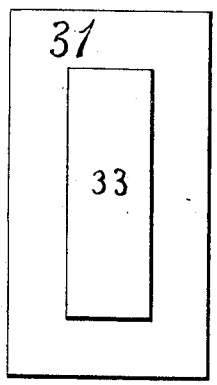
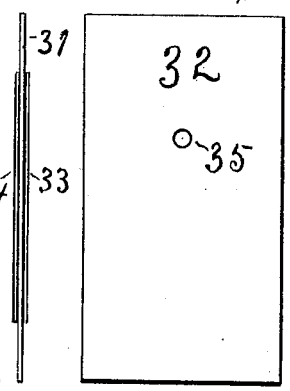
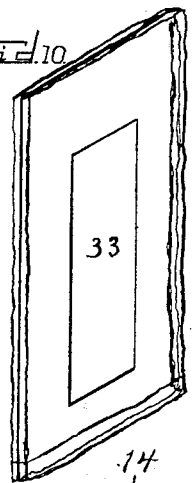
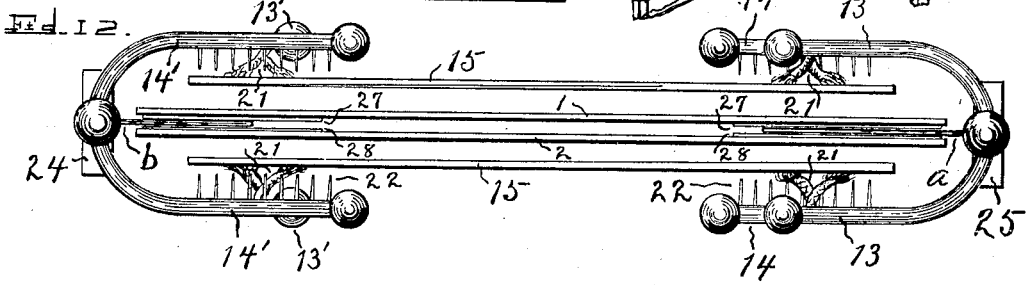
Witnesses
Howard Fisher.
Arthur Sturges.
Otto Baysdorfer, Inventor,
By Hiram A. Sturges
Attorney
THE NORRIS PETERS CO., WASHINGTON, D. C.

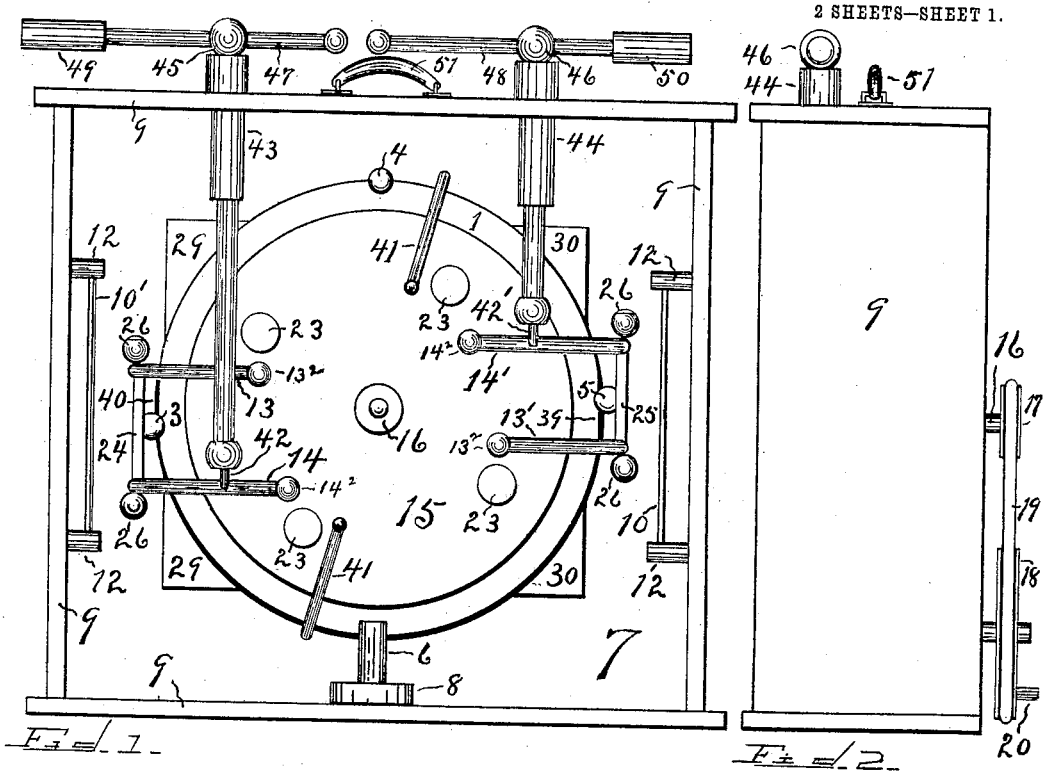

UNITED STATES PATENT OFFICE.

OTTO BAYSDORFER, OF OMAHA, NEBRASKA.

STATIC ELECTRIC MACHINE.

No. 827,497. Specification of Letters Patent. Patented July 31, 1906.

Application filed November 9, 1905. Serial No. 286,527.

*To all whom it may concern:*

Be it known that I, OTTO BAYSDORFER, a citizen of the United States, residing at Omaha, in the county of Douglas and State of Nebraska, have invented certain new and useful Improvements in Static Electric Machines, of which the following is a specification.

My invention relates to improvements in static electric machines for exciting, storing, and discharging electricity, and has reference to novel features of construction employed, and particularly to the presentation of a new form of condenser, and improvements for accumulation of electrical charges, adaptability for withstanding damp-weather influences, and for dismemberment; improvement in manner of mounting induction-disks and manner of making contact of armatures of the induction-disks with metal brush-bearing arms; the mounting of electrical collector-arms relatively with brush-bearing arms to conveniently increase the friction-field, and the introduction of flat storage-plates which discharge new functions; the grouping of necessary metal parts and insulating them; the mounting of the vertical conductor-rods directly upon the collector-arms in a manner to decrease the size of the inclosing case.

The principal reason for employing and arranging the novel parts of the invention in the manner shown has been the construction of a machine which would be of small size and light weight and which would possess power equal to larger machines.

With these and other objects in view the invention presents a novel construction and arrangement of parts, as disclosed herein.

In the drawings, Figure 1 represents a vertical front elevation of the invention mounted in the inclosing case 9, the principal parts being mounted upon the supporting-leaf 7, the front of the case not being shown. Fig. 2 represents an end view of Fig. 1. Fig. 3 represents a rear view of the supporting-leaf, being a vertical elevation showing rotating means mounted on the outer side and parts broken away to show vertically-mounted storage-plates mounted upon the inner side of the supporting-leaf and relative position of the plates. Fig. 4 is a vertical elevation showing one of the inner sides of frame 9 and one of the insulating-plates 10 or 10′ mounted thereon. Fig. 5 represents a plan view of Fig. 3 introduced to clearly show relative positions of parts mounted on supporting-leaf 7, this part of the machine and supporting-leaf 7 being removable from the frame 9, the rods 42 and 42′ being detachable from the electrical collecting-arms 14 and 14′, respectively, at their points of contact. Fig. 6 is a detail of Fig. 1 to indicate the positions of the circular fields of tin-foil upon the interior surfaces of induction-disks 1 and 2, and the relative positions of the conducting-rods $a$ and $b$, the inner ends of which make contact with the tin-foil. Fig. 7 represents a vertical side view of the glass plate used as one of the parts of the condensers, the central field of tin-foil being represented by the numeral 33. Fig. 8 represents an end view of the parts shown in Fig. 7, the central fields of tin-foil mounted thereon being represented by the numerals 33 and 34. Fig. 9 represents a face view of the insulating-plate employed to cover the field 34 of tin-foil, the aperture appearing at the numeral 35. Fig. 10 represents a perspective view of the two plates shown by Figs. 8 and 9, joined to form a unit condenser, the edges being sealed or cemented by a non-conducting substance. Fig. 11 represents an end view of Fig. 10. Fig. 12 is a detail of Fig. 5, being an enlarged view of certain parts thereof to particularly illustrate the position of metal conducting-rods $a$ and $b$ with reference to the circular fields of tin-foil 27 and 28 and to show the mounting of said metal conducting-rods on the metal brush-bearing arms.

Referring to the several drawings, the numerals 1 and 2 represent circular stationary central induction plates or disks mounted upon non-conducting posts 3, 4, and 5, said posts being mounted near the outer edges of the vertically-disposed supporting-leaf 7 and extending inwardly therefrom at substantially a right angle. The central disks are preferably constructed of glass usual to machines of this class and have a lower mounting or support upon the non-conducting post 6, this post being constructed integral with the base 8 The base 8 rests slidably upon the lower part of the frame 9 and is constructed rigid with the supporting-leaf 7. Nearly all of the mechanism employed is operatively mounted upon the vertical supporting-leaf 7, and the latter is readily removable from the frame or case 9, and in this manner is furnished a convenient means for obtaining access to any of the parts in case of accident or for repairs. The only parts not mounted upon the supporting-leaf 7 are the non-conducting sleeves 43 and 44, which inclose the vertical conducting-rods 42 and 42', the insulating-plates 10 and 10', and of course the slidable discharging-rods 47 and 48 at the top of the case, it being understood that leaf 7 and base 8, rigidly mounted thereon, is adapted to have a sliding movement horizontally within frame 9, the collector-arms 14 and 14' coming in correct horizontal alinement with the lower ends of the vertically-extending conducting-rods 42 and 42' at the time of assembling, and since conducting-rods 42 and 42', as well as sleeves 43 and 44, are not adapted to have any vertical movement the collector-arms will make reliable contact with the lower ends of said conductor-rods whenever supporting-leaf 7 is replaced in the frame. Plates 10 and 10' are rigidly mounted upon the inner sides of the frame or case 9 by means of the series of insulating-posts 12. The insulating-plates 10 and 10' occupy a vertical position adjacent to the U-shaped collecting-arms 14 and 14' and U-shaped brush-bearing arms 13 and 13', and these insulating-plates are no obstruction to the removal of supporting-leaf 7 and mechanism mentioned, from the case 9.

I employ the circular plates 15 and 15' of a less diameter but of similar material to the inner plates or disks 1 and 2 and rigidly mount them, insulated, upon the shaft 16, the latter being suitably journaled upon the vertical supporting-leaf 7, and provide the pulleys 17 and 18, connected by the belt 19, the last-named pulley being provided with the handle 20, and by rotating pulley 18 a circular movement is imparted to plates 15 and 15' in a manner so that the rotation will be in a direction from the brush-bearing arms toward the collector-arms. Plates 15 and 15' are positioned one upon either side of and parallel with the inner disks 1 and 2.

The metal brush-bearing arms 13 and 13' are provided with friction-brushes 21. The metal collector-arms 14 and 14' are provided with metal collector-points 22, these brushes and collector-points being mounted transversely to the outer vertical surfaces of plates 15 and 15', the brushes being in contact and the collector-points closely adjacent to the outer surfaces of these plates, and on the outer surfaces of said plates 15 and 15' are mounted at regular intervals the series of small disks 23, which aid in the generation and collection of electricity.

Upon the horizontally-disposed non-conducting posts 3 and 5 are rigidly and vertically mounted the non-conducting standards 24 and 25, which furnish a mounting for the metal brush-bearing and collector-arms, this mounting being effected by means of screws having the globular heads 26, this mounting of the electrical collector-arms, as well as that of the brush-bearing arms, being rigid upon their respective standards, said arms extending at right angles to the standards and parallel with each other. By this construction the operative metal parts are closely assembled in a manner so that they may be effectively insulated by the adjacent vertically-disposed plates 10 and 10'; also by reason of this parallel arrangement the distance apart of the inner ends of each metal collector-arm from each metal brush-bearing arm is conveniently made greater than when mounted convergingly toward the center of these disks.

Upon the inner surfaces of stationary disks 1 and 2 and near the peripheries thereof are mounted armatures, as the circular fields of tin-foil 27 and 28, Fig. 6, in a manner so that each field 27 and 28 will lie opposite each other, this being a common construction in machines of this class, except that the tin-foil has generally been extended from the armature-field to a point flush with the periphery. This I consider a faulty construction, and therefore employ the metal conducting-rods $a$ and $b$, Figs. 5, 6, and 12. The rod $a$ makes contact with the upper end 28' of field 28, and conducting-rod $b$ makes contact with the lower end 27' of field 27. The conducting-rods $a$ and $b$ are constructed of smooth metal and have a rigid mounting upon the inner center of the U-shaped brush-bearing arms and are effective electrical conductors for transferring electrical charges from the armature parts 27 and 28 to the metal brush-bearing arms 13 and 13', Figs. 1 and 6. This construction avoids the objectionable extension of the tin-foil from the ends of each inner circular armature to the edge of the disk, above described, resulting generally in an escape of a portion of the electrical charges. It is found that the use of these rods $a$ and $b$ allows practically no escape of the charges.

As a means for storing electrical charges I employ the reservoirs or condensers 29 and 30, which will now be explained. These reservoirs are similarly constructed of two non-conducting plates, as the glass plates 31 and 32, Figs. 7 and 9, of similar size and preferably of rectangular form. Upon each side of plate 31 are mounted armatures, as the sheets of tin-foil 33 and 34, Fig. 8. The sheet 34, as well as the surface of plate 31, upon which sheet 34 is mounted, is then covered by one of the sides of plate 32. Said plate 32 is a simple plate of glass provided with no armature, but is perforated at 35, and the edges of both plates after being thus positioned are made rigidly adhesive, as by sealing or inclosing these edges with a non-conducting cement. The sealing along the entire edges of the plates after placing one upon the other is very thorough, and the edges generally present a somewhat rough appearance, as best shown by Fig. 10 or Fig. 11, and plates 31 and 32 after being thus joined are employed as condensers in the invention, one of their functions being to receive and contain electrical charges. These storage-plates, however, perform at least two other functions, as will be presently explained. The sealing together of the plates in the manner described with non-conducting cement is for the purpose, as is obvious, of preventing the escape of the accumulated charges. The aperture 35 is cut transversely through the side of plate 32 and a metal conductor 36, Fig. 5, is employed leading from each of the metal U-shaped collector-arms 14 and 14' to and through the apertures 35, Fig. 9, so that said conductors 36 contact with the respective sheets 34.

The condenser 30 is mounted vertically and rigidly upon non-conducting posts 5 and 37, and condenser 29 is mounted vertically and rigidly upon non-conducting posts 3 and 38. The condensers as thus mounted occupy substantially the same vertical plane and are positioned, laterally considered, about midway between the vertical supporting-leaf 7 and the adjacent U-shaped metal arms above mentioned, and it will be noted that on account of this construction the condensers occupy a very limited lateral space which is considered a great advantage since it adds to the portable features of the invention. There is now a demand for static electric machines of light weight and occupying small space, and the invention permits this construction by reason of the slight lateral space occupied by the condensers.

The condensers 29 and 30 are coated with shellac, thereby not being readily influenced by moisture for electrical generation or conduction, and the plate 32 of each condenser operates as an insulator between the stored charges of said condensers and the adjacent parts of the machine in a manner to prevent the escape of the charges, this being another function discharged.

In order that disks 1 and 2 may not be displaced or rotated, I construct the facets 39 and 40, cut from the periphery of these disks, and the squared edges thus formed are placed within slots 52 and 52', Fig. 5, in a manner to prevent rotation of said disks, and this preserves the contact of metal rods $a$ and $b$ with the ends of the fields of tin-foil 27 and 28.

From the description thus given it will be understood that electricity is excited by rotation of plates 15 and 15' upon the surfaces of which the brushes 21 make contact, the electric charges being received upon the metal collector-points 22 and conveyed upon the metal U-shaped collector-arms to rods 36, and thence conducted to the condensers 29 and 30, positive electricity being conducted to one condenser and negative electricity being conducted to the other of said condensers by repeated charges, this separation being effected by means of the armatures upon the stationary induction-disks coöperating with rods $a$ and $b$ and the electrical exciting means described. During this process of rotation the neutralizing-rod 41 and the brushes 41' thereon discharge their usual function to cause electrical neutrality of a part of the surfaces of disks 15 and 15'.

Metal conducting-rods 42 and 42', Fig. 1, extend upward from the collector-arms 14 and 14' through non-conducting sleeves 43 and 44. These sleeves are mounted rigidly upon the upper part of the case and terminate in balls 45 and 46. Slidable discharging-rods 47 and 48 are mounted within suitable openings through these heads or balls 45 and 46, and non-conducting handles 49 and 50 are employed, and since a metal and electrical contact is made in the manner described the stored electricity may be discharged in a manner generally well known.

The machine or case is provided with a suitable handle 51, and being unusually portable by reason of the devices described is a very convenient construction, having equal capacity with large machines. In order that there may be a loss of the least amount of electricity possible during its generation, the flat vertically-disposed storage-plates are utilized as insulators, as above described, and nearly all of the metal parts are assembled at central parts of the machine and thoroughly insulated by means of plates 10 and 10', already mentioned. The metal balls 26 and balls 13² and 14² upon the free ends of all of the U-shaped arms have extensive surfaces for the sole purpose of preventing any loss at these terminals. While a narrow construction in order to secure portability is made possible by employment of vertically-placed storage-plates, it will be noted that a saving is made of space, since the conducting-rods 42 and 42' pass vertically from collector-arms 14 and 14' directly to the upper part of the case.

What I claim as my invention is—

1. In combination, a static electric machine comprising a case having side walls and a vertically-disposed supporting-leaf; U-shaped brush-bearing arms and U-shaped collector-arms; transversely-disposed non-conducting posts rigidly mounted upon and near the outer edges of said vertically-disposed supporting-leaf; stationary armatured induction-disks disposed parallel with said vertically-disposed supporting-leaf and having squared edges engaging said transversely-disposed non-conducting posts; rotatable disks mounted parallel with and operatively adjacent to said stationary armatured induction-disks; said U-shaped brush-bearing arms and U-shaped collector-arms mounted insulatedly and adjacent to the side walls of said case and extending operatively adjacent to said rotatable disks; vertically-disposed storage-plates electrically connected with the collector-arms and mounted upon said transversely-disposed non-conducting posts and extending parallel with and between said vertically-disposed supporting-leaf and said rotatable disks; a metal connecting-rod upon said U-shaped brush-bearing arms and extended between said stationary armatured induction-disks; and insulated conducting-rods mounted on said collector-arms and extended upwardly therefrom.

2. A static electric machine, in combination, comprising stationary induction-disks, a case having side walls and a supporting-leaf, vertically disposed and rotatable disks mounted upon said supporting-leaf parallel with and operatively adjacent to said stationary induction disks; brush-bearing arms and collector-arms horizontally disposed and mounted adjacent to the inner sides of said case and extended substantially parallel in a manner to traverse the opposite peripheries of said rotatable disks; vertically-disposed storage-plates electrically connected with said collector-arms and mounted interposedly between said rotatable disks and said supporting-leaf, and upwardly-extending insulated conducting-rods contactingly mounted upon said collector arms.

3. In a static electric machine, the combination of a pair of disks mounted stationary and parallel and provided with armatures upon their inner sides near their peripheries, a pair of revoluble disks adjacent to said stationary disks and mounted parallel; metal brush-bearing arms mounted operatively adjacent to said revoluble disks; metallic rods formed upon said metal brush-bearing arms and extended between said stationary disks to said armatures; collector-arms mounted within operative proximity to said pair of revoluble disks; a pair of electrical accumulators; each of the electrical accumulators of said pair comprising a first glass plate having an armature upon the central part of each side surface thereof, a second glass plate mounted flatwise upon each first glass plate in a manner to cover one of the armatures upon the central part of the side surface of said first glass plate; said first and second glass plates of each of the accumulators of said pair having substantially coincident edges inclosed with non-conducting material; an aperture formed in each of said second glass plates adjacent to each of said covered armatures of each of said first glass plates of said pair of accumulators, and a metal rod inserted in each of said apertures to electrically connect said covered armatures of each of said first glass plates of said pair of electrical accumulators with said collector-arm.

4. A static electric machine, in combination, comprising a case having side walls and a supporting-leaf, vertically-disposed and rotatable disks mounted upon said supporting-leaf parallel with and operatively adjacent to stationary induction-disks; brush-bearing arms and collector-arms horizontally disposed and mounted adjacent to the inner sides of said case and extended substantially parallel in a manner to traverse the opposite peripheries of said rotatable disks; vertically-disposed insulating-plates mounted interposedly between the inner sides of said case and said brush-bearing and collector-arms; vertically-disposed storage-plates electrically connected with said collector-arms and mounted interposedly between said rotatable disks and said supporting-leaf and upwardly-extending insulated conducting-rods contactingly mounted upon said collector-arms.

In testimony whereof I affix my signature in presence of two witnesses.

OTTO BAYSDORFER.

Witnesses:
FREDERIC BAEM,
C. McLEOD.